(12) United States Patent
Chauveau

(10) Patent No.: US 10,317,719 B2
(45) Date of Patent: Jun. 11, 2019

(54) THIN-FILM TRANSISTOR LIQUID CRYSTAL DISPLAY WITH AN AIR FLOW SYSTEM

(71) Applicant: VISTEON GLOBAL TECHNOLOGIES, INC., Van Buren Township, MI (US)

(72) Inventor: Benoit Chauveau, Van Buren Township, MI (US)

(73) Assignee: Visteon Global Technologies, INC., Van Buren Township, MI (US)

( * ) Notice: Subject to any disclaimer, the term of this patent is extended or adjusted under 35 U.S.C. 154(b) by 0 days.

(21) Appl. No.: 15/666,184

(22) Filed: Aug. 1, 2017

(65) Prior Publication Data

US 2019/0041686 A1 Feb. 7, 2019

(51) Int. Cl.
*G02F 1/1333* (2006.01)
*G02F 1/1335* (2006.01)
*G02F 1/1368* (2006.01)

(52) U.S. Cl.
CPC ...... *G02F 1/133385* (2013.01); *G02F 1/1368* (2013.01); *G02F 1/13362* (2013.01); *G02F 1/133308* (2013.01); *G02F 1/133514* (2013.01); *G02F 1/133528* (2013.01); *G02F 2001/133302* (2013.01); *G02F 2001/133317* (2013.01); *G02F 2001/133322* (2013.01); *G02F 2201/36* (2013.01)

(58) Field of Classification Search
None
See application file for complete search history.

(56) References Cited

U.S. PATENT DOCUMENTS

| 5,453,859 | A * | 9/1995 | Sannohe | G02B 27/283 349/9 |
| 5,682,216 | A * | 10/1997 | Lin | G02F 1/133385 349/122 |
| 5,835,179 | A * | 11/1998 | Yamanaka | G02F 1/133385 349/161 |
| 6,933,991 | B2 * | 8/2005 | Sanelle | G02F 1/13338 349/158 |
| 2004/0075779 | A1* | 4/2004 | Paukshto | G02F 1/13338 349/12 |
| 2005/0270468 | A1* | 12/2005 | Choi | G02F 1/1334 349/155 |
| 2006/0274412 | A1* | 12/2006 | Koyama | G02F 1/133308 359/443 |
| 2009/0147170 | A1* | 6/2009 | Oh | G02F 1/133308 349/58 |
| 2009/0207348 | A1* | 8/2009 | Hashimoto | G02F 1/133528 349/96 |
| 2009/0215351 | A1* | 8/2009 | Kobayashi | G02F 1/133308 445/24 |
| 2014/0125914 | A1* | 5/2014 | Fujita | B60K 35/00 349/60 |
| 2014/0362325 | A1* | 12/2014 | Lee | G02F 1/133308 349/58 |

(Continued)

*Primary Examiner* — Ryan Crockett
(74) *Attorney, Agent, or Firm* — Quinn IP Law

(57) ABSTRACT

Disclosed herein is a thin-film transistor (TFT) liquid crystal display (LCD) employing an air flow system by the introduction of a gap. The gap may be formed by also introducing a housing portion for selective layers of the TFT LCD. Also disclosed herein is a method of implementing the same.

13 Claims, 4 Drawing Sheets

(56) References Cited

U.S. PATENT DOCUMENTS

| | | | |
|---|---|---|---|
| 2015/0177548 A1* | 6/2015 | Jeon | G02F 1/133308 349/12 |
| 2015/0219811 A1* | 8/2015 | Kobayashi | G02B 5/3016 349/194 |
| 2015/0277218 A1* | 10/2015 | Nagatsu | H04N 9/3105 349/5 |
| 2016/0313602 A1* | 10/2016 | Xie | G02F 1/133555 |
| 2016/0377911 A1* | 12/2016 | Wu | G02F 1/133504 349/106 |
| 2017/0075160 A1* | 3/2017 | Yang | G02F 1/1333 |
| 2017/0108726 A1* | 4/2017 | Yanai | G02B 5/30 |
| 2017/0285382 A1* | 10/2017 | Hasegawa | G06F 3/045 |

* cited by examiner

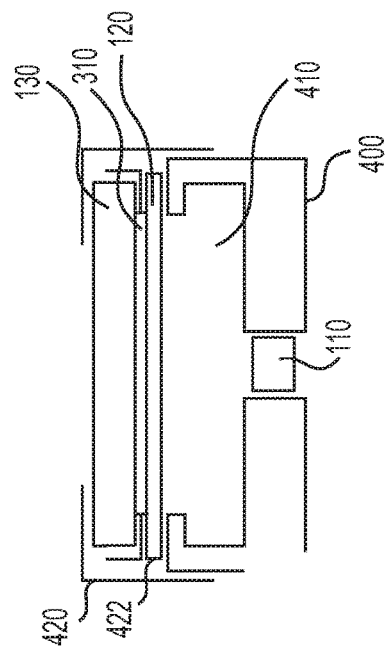
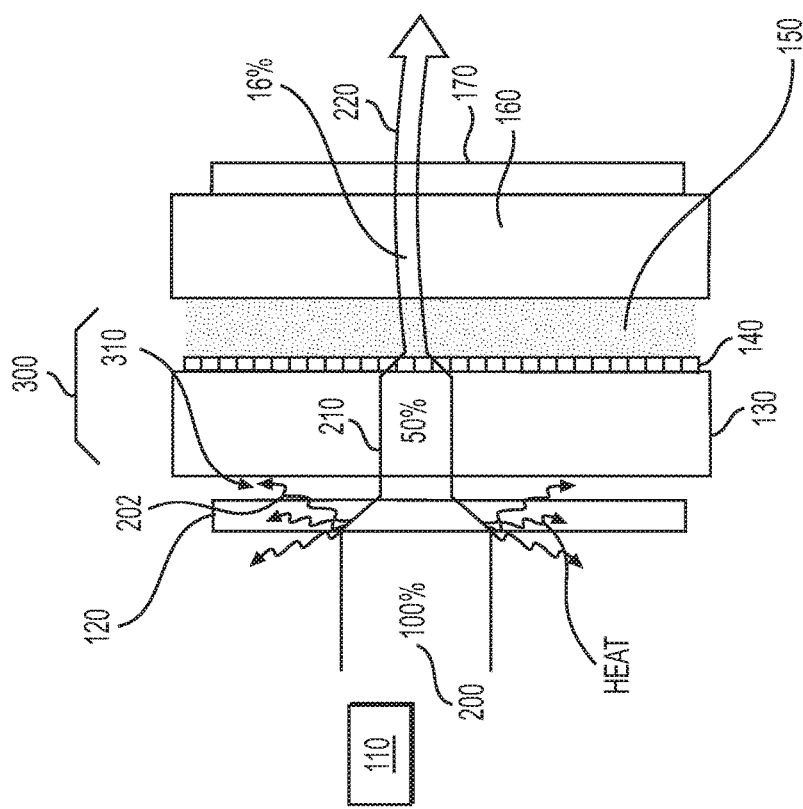
FIG. 4
FIG. 3

THIN-FILM TRANSISTOR LIQUID CRYSTAL DISPLAY WITH AN AIR FLOW SYSTEM

BACKGROUND

Electronic displays are provided in many contexts to electronically render digital information to a viewer. The electronic displays receive information, and render the information through lighted cells in patterns that reflect the texts and pictures employed to convey the information.

Various electronic technology and semiconductor concepts are employed to implement electronic displays. One such concept is a thin-film transistor (TFT) liquid crystal display (LCD) device. These devices are employed in various contexts, such as computing devices, televisions, mobile devices, and more commonly, in vehicle-based display implementations (such as instrument clusters and infotainment systems).

FIG. 1 illustrates a side-view of an exemplary TFT LCD 100. FIG. 2 illustrates the same side-view of the TFT LCD 100 with an explanatory diagram illustrating various effects associated with illuminating the TFT LCD 100 with a light 200 generated from a backlight 110.

The TFT LCD 100 is shown without a housing for illustrative purposes. The TFT LCD 100 is coupled to a backlight source 110 (not shown). The backlight 110 provides light 200 that is either propagated through (or not allowed to propagate through) based on the pattern chosen by a processor coupled to, and configured to drive the TFT LCD 100.

The first layer physically closest to the backlight 110 is a rear polarizer 120. The rear polarizer 120 is provided to polarize the light 200 so as to prepare the light 200 to be receivable by the liquid crystal layer 150. As shown in FIG. 2, as light 200 propagates through the rear polarizer 120 (at point 201), the light 200 signal strength is reduced by 50% (to create light 210). The TFT LCD 100 also includes a glass layer 130, physically disposed on the rear polarizer 120, and in between the rear polarizer 120 and a color filter 140.

As shown, a liquid crystal layer 150 is also disposed in between the color filter 140 and another glass layer 160. The color filter 140 allows the selective control of color. As light 210 is propagate through the color filter 140, the signal strength of the light is once again reduced by approximately 70%, thereby creating light 220.

Light 220, after propagating through the liquid crystal layer 150 (selectively controlled to be either on/off related to an electronic coupling controlling the state of the liquid crystals), is propagated through the glass 160 and through a front polarizer 170. The front polarizer 170 compensates the polarization effects introduced by the rear polarizer 120. After which, light 220 is viewable by any viewer of the TFT LCD 100.

Heat 202 associated with this transformation of light is dissipated through the rear polarizer 120, the first glass layer 130, and the color filter 140 to the TFT LCD 100. The liquid crystal layer 150 has numerous crystals which are affected by the heat 202. If light 200 is of a certain strength, deleterious effects associated with overheating the liquid crystal cells 150 may be introduced, and ultimately effect the proper operation of the liquid crystals in the liquid crystal layer 150.

Each glass layer (glass layer 130 and glass layer 160) may effectively serve as a substrate associated with the TFT associated with individual control. For example, one layer may be employed to control content (i.e., whether a specific pixel is on/off) while another may be employed to control color. The TFT LCD 100 shown in FIG. 1 is exemplary, with the TFTs used to control content and color being interchangeable.

SUMMARY

The following description relates to a thin-film transistor (TFT) liquid crystal display (LCD) employing an air flow system. Exemplary embodiments may also be directed to any of a method for implement the TFT LCD.

Disclosed herein is a thin-film transistor (TFT) liquid crystal display (LCD). The TFT LCD device includes a backlight configured to project light through transparent layers of the TFT LCD; a rear polarizer with a surface facing the backlight; a first glass substrate layer with a surface facing the rear polarizer; a gap introduced between the rear polarizer and the first glass substrate; a color filter physically attached to the first glass substrate; a liquid crystal layer physically attached to the first glass substrate; a second glass substrate physically attached to the liquid crystal layer; and a front polarizer physical attached to the second glass substrate.

Additional features of the invention will be set forth in the description which follows, and in part will be apparent from the description, or may be learned by practice of the invention.

It is to be understood that both the foregoing general description and the following detailed description are exemplary and explanatory and are intended to provide further explanation of the invention as claimed. Other features and aspects will be apparent from the following detailed description, the drawings, and the claims.

DESCRIPTION OF THE DRAWINGS

The detailed description refers to the following drawings, in which like numerals refer to like items, and in which:

FIG. 3 illustrates a side-view of a TFT LCD system according to an exemplary embodiment;

FIG. 4 illustrates an example implementation of the TFT LCD system; and

DETAILED DESCRIPTION

Figure 1:
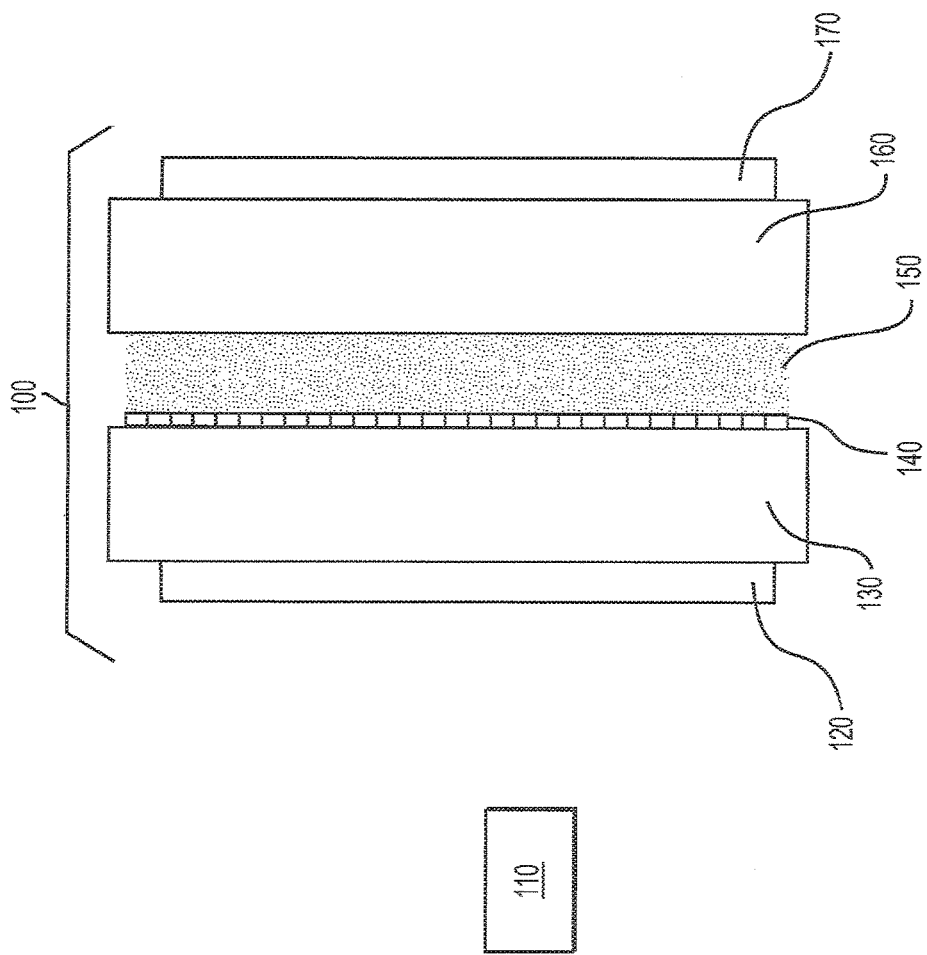
FIG. 1 illustrates a side-view of a thin-film transistor (TFT) liquid crystal display (LCD) system according to a conventional implementation.
Figure 2:
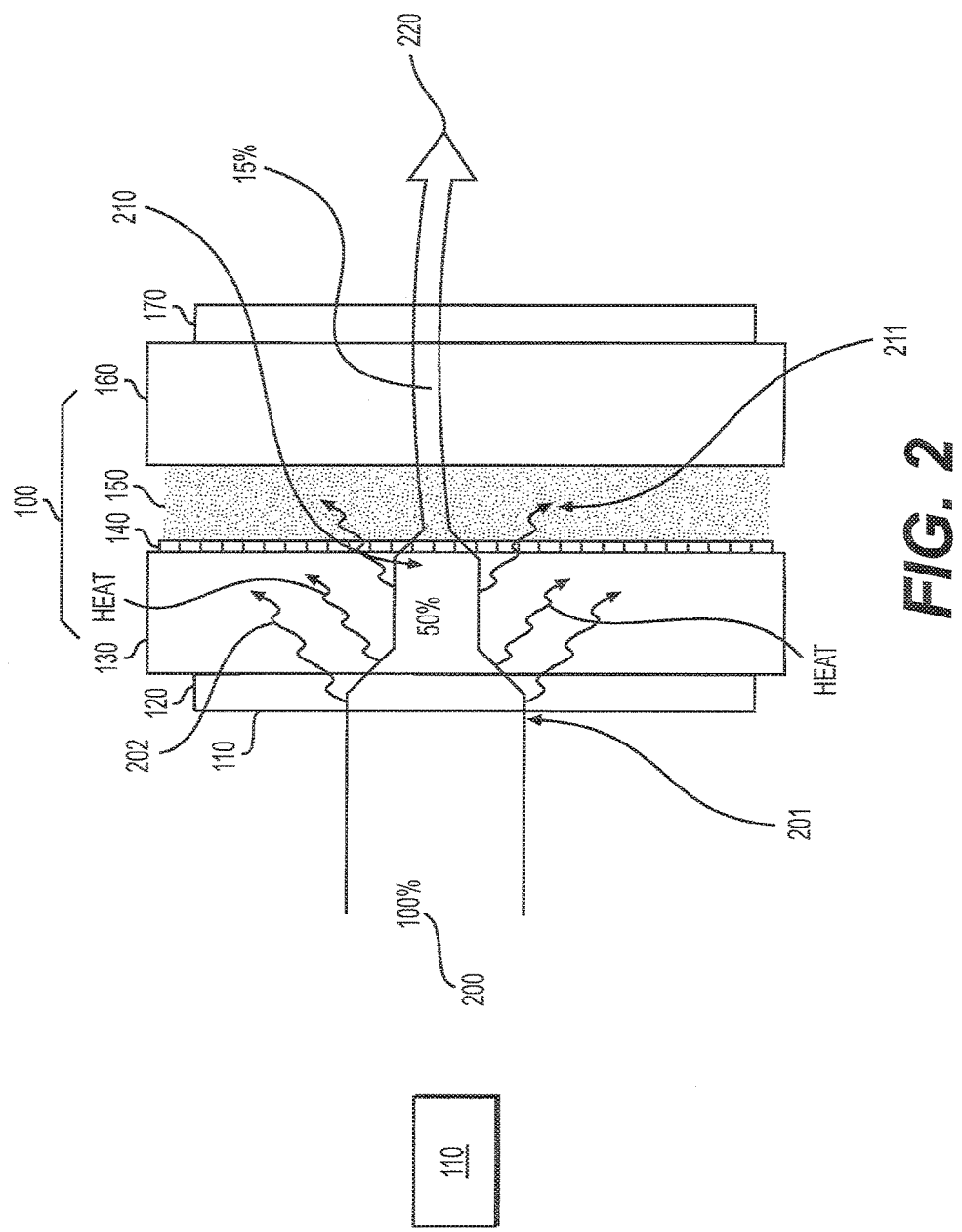
FIG. 2 illustrates a side-view of a TFT LCD system receiving a backlight according to a conventional implementation.

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

The TFT LCD (such as the one shown in FIG. 1) are selected to be implemented in a variety of contexts as implementers may achieve improvements in image quality, addressability, and contrast control over simple LCD implementations (active or passive matrix). The TFT LCDs are often implemented along with a backlight 110 employed to source light to the display, with the control of the various electronic components (each TFT) and the interplay with the liquid crystals being employed to display digital content.

However, as explained in the Background section, various deleterious effects associated with parasitic heat caused by transmission through polarizing layers causing overheating of the liquid crystals. Thus, as the liquid crystals are disturbed from this overheating, the proper operation of the TFT LCD is ultimately frustrated.

Disclosed herein is a TFT LCD employing an air flow system, thereby reducing or eliminating the deleterious effects described in the background of this disclosure. Also disclosed herein are methods for implementing said TFT display.

FIG. 3 illustrates a side-view of a TFT LCD 300 according to an exemplary embodiment. Referring to FIG. 3, several similar components/layers are employed as described in FIG. 1, and the same reference numerals are employed for clarity. However, as explained below, due to the configuration and additional elements shown in FIG. 3, the various componentry operates different with several unexpected results.

Also shown in FIG. 3 is an example employment of light 200 being generated from backlight 110 (not shown). Referring to FIG. 3, a rear polarizer 120 is similarly situation, and situated in a position to receive light 200 from a backlight 110.

However, newly introduced is a vacuum or gap 310 in between a surface of the rear polarizer and a surface of the glass substrate 130 (or first TFT layer). Thus, and as shown in FIG. 3, the heat 202 created by light 200 passing through the rear polarizer layer is effectively dissipated and propagated through the gap 310, and not to the liquid crystal layer 150.

FIG. 4 illustrates an implementation of the TFT LCD 300 with a housing 400. As shown the housing 400 includes a box-like structure with an aperture to insert a backlight 110. The backlight 110 (which may be a light-emitting diode (LED)) is configured to propagate light through a light house 410 and to the rear polarizer 120.

The housing 400 includes grooves 420, with shelf-like portions, to insert both the rear polarizer 120 and the first glass substrate 130. As shown in FIG. 4, grooves 420 includes a first groove 420 configured to support the rear polarizer 120 and a second groove 422 configured to support the first glass substrate 130. Employing the first and second grooves 420, 422, the housing 400 cooperates to define a gap or space 310 of the air flow system, thereby ensuring that a space exists between the surface of the rear polarizer 120 positioned on the first groove 420 of the housing 400 and the surface of the first glass substrate 130 positioned on the second groove 422 of the housing 400.

Figure 5:
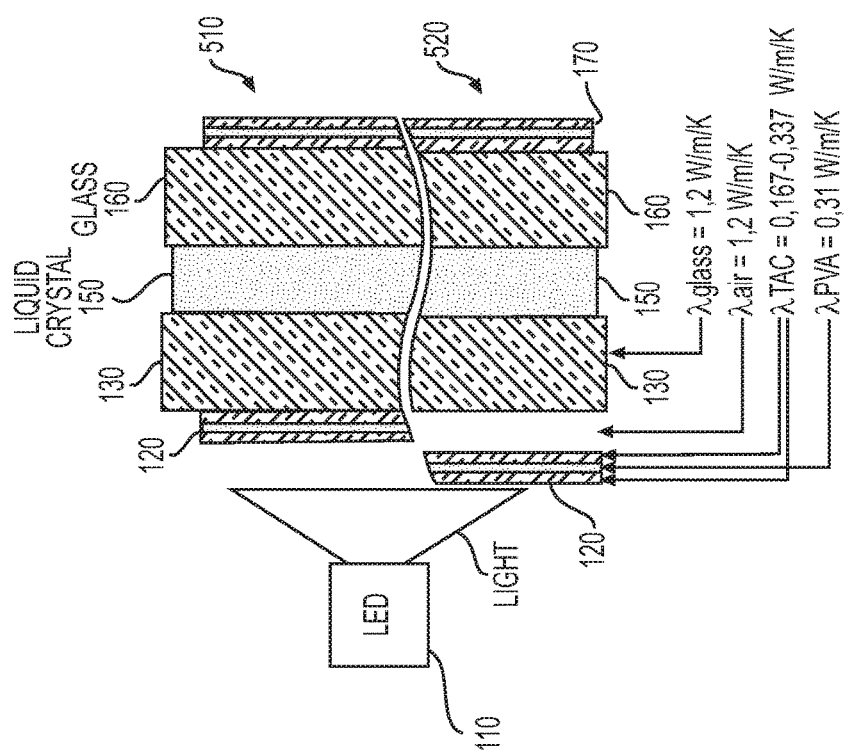
FIG. 5 illustrates a comparative diagram of the convention implementation and the display shown in FIG. 3.

FIG. 5 illustrates gains in thermal resistance achieved in the exemplary embodiment 520 versus the convention implementation (510). Employing the values shown in FIG. 1, the convention implementation 510 experiences a thermal resistance of 0.001 K/W, while the exemplary embodiment experiences a thermal resistance of 0.04 K/W. Thus, employing the air gap 310 achieves thermal resistance of approximately 40 times stronger than existing TFT LCD devices.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

I claim:

1. A thin-film transistor (TFT) liquid crystal display (LCD), comprising:
    a backlight configured to project light through transparent layers of the TFT LCD;
    a rear polarizer with a surface facing the backlight configured to receive light projected from the backlight;
    a first glass substrate layer with a surface facing the rear polarizer;
    an air flow system for dissipating heat caused by transmission of light from the backlight, wherein the air flow system includes a gap extending between a space formed by the positioning of and cooperation between the rear polarizer and the surface of the first glass substrate facing the rear polarizer;
    a color filter physically attached to the first glass substrate;
    a liquid crystal layer physically attached to the first glass substrate;
    a second glass substrate physically attached to the liquid crystal layer; and
    a front polarizer physically attached to the second glass substrate,
    wherein the air flow system reduces overheating of the liquid crystal layer by dissipating heat caused by the transmission of light from the backlight through the gap formed between the rear polarizer and the surface of the first glass substrate layer facing the rear polarizer.

2. The TFT LCD according to claim 1, further comprising a housing, the housing configured to couple at least the backlight, the rear polarizer and the first glass substrate layer.

3. The TFT LCD according to claim 2, wherein the housing comprises an aperture on an outer edge for embedding the backlight, and a light box in between the backlight and the rear polarizer.

4. The TFT LCD according to claim 3, wherein the housing further comprises a first groove configured to support the rear polarizer, and a second groove configured to support the first glass substrate, wherein the gap of the air flow system is formed between a space defined between the rear polarizer positioned on the first groove of the housing and the surface of the first glass substrate with first glass substrate positioned on the second groove of the housing.

5. The TFT LCD according to claim 1, wherein the air flow system provides a thermal resistance of about 0.04 K/W to the TFT LCD to reduce overheating of the liquid crystal layer by dissipating heat caused by the transmission of light from the backlight through the gap formed between the rear polarizer and the surface of the first glass substrate layer facing the rear polarizer.

6. A method for manufacturing a thin-film transistor (TFT) liquid crystal display (LCD), comprising:

providing a backlight configured to project light through transparent layers of the TFT LCD;

providing a rear polarizer with a surface facing the backlight configured to receive light projected from the backlight;

providing a first glass substrate layer with a surface facing the rear polarizer;

providing an air flow system for dissipating heat caused by transmission of light from the backlight, wherein the air flow system includes a gap extending between and defined by the positioning of and cooperation between the rear polarizer and the surface of the first glass substrate facing the rear polarizer;

affixing a color filter to the first glass substrate;

affixing a liquid crystal layer to the first glass substrate;

affixing a second glass substrate to the liquid crystal layer; and affixing a front polarizer to the second glass substrate.

7. The method according to claim 6, further comprising providing a housing configured to couple at least the backlight, rear polarizer, the gap, and the first glass substrate.

8. The method according to claim 7, further comprising providing at least a first groove in the housing and a second groove in the housing disposed proximate the first groove.

9. The method according to claim 8, wherein the first groove of the housing is configured to support the rear polarizer in the housing and the second groove of the housing is configured to support the first glass substrate, wherein the rear polarizer and the first glass substrate disposed in the housing cooperate to define the gap of the air flow system between the rear polarizer and the surface of the first glass substrate facing the rear polarizer.

10. The method according to claim 6, wherein the air flow system provides a thermal resistance of about 0.04 K/W to the TFT LCD to reduce overheating of the liquid crystal layer by dissipating heat caused by the transmission of light from the backlight through the gap formed between the rear polarizer and the surface of the first glass substrate layer facing the rear polarizer.

11. A thin-film transistor (TFT) liquid crystal display (LCD), comprising:

a housing, the housing having at least a first groove and a second groove disposed proximate the first groove;

a backlight coupled to the housing configured to project light through transparent layers of the TFT LCD;

a rear polarizer coupled to the first groove of the housing, the rear polarizer having a surface facing the backlight configured to receive light projected from the backlight;

a first glass substrate layer coupled to the at least one second groove of the housing, wherein the first glass substrate layer includes a surface facing the rear polarizer;

an air flow system for dissipating heat caused by transmission of light from the backlight, wherein the air flow system includes a gap extending between and defined by the positioning of and cooperation between the rear polarizer and the first glass substrate;

a color filter physically attached to the first glass substrate;

a liquid crystal layer physically attached to the first glass substrate;

a second glass substrate physically attached to the liquid crystal layer; and a front polarizer physical attached to the second glass substrate, wherein the air flow system reduces overheating of the liquid crystal layer by dissipating heat caused by the transmission of light from the backlight through the rear polarizer and the first glass substrate layer.

12. The TFT LCD according to claim 11, wherein the housing comprises an aperture on an outer edge for embedding the backlight, and a light box in between the backlight and the rear polarizer.

13. The TFT LCD according to claim 11, wherein the air flow system provides a thermal resistance of about 0.04 K/W to the TFT LCD to reduce overheating of the liquid crystal layer by dissipating heat caused by the transmission of light from the backlight through the gap formed between the rear polarizer and the surface of the first glass substrate layer facing the rear polarizer.

\* \* \* \* \*